April 8, 1969   R. L. HOUGH   3,437,511
METAL SURFACED WITH BORON AND COATING OF SILICON, SILICON
CARBIDE OR TITANIUM NITRIDE
Filed April 7, 1966
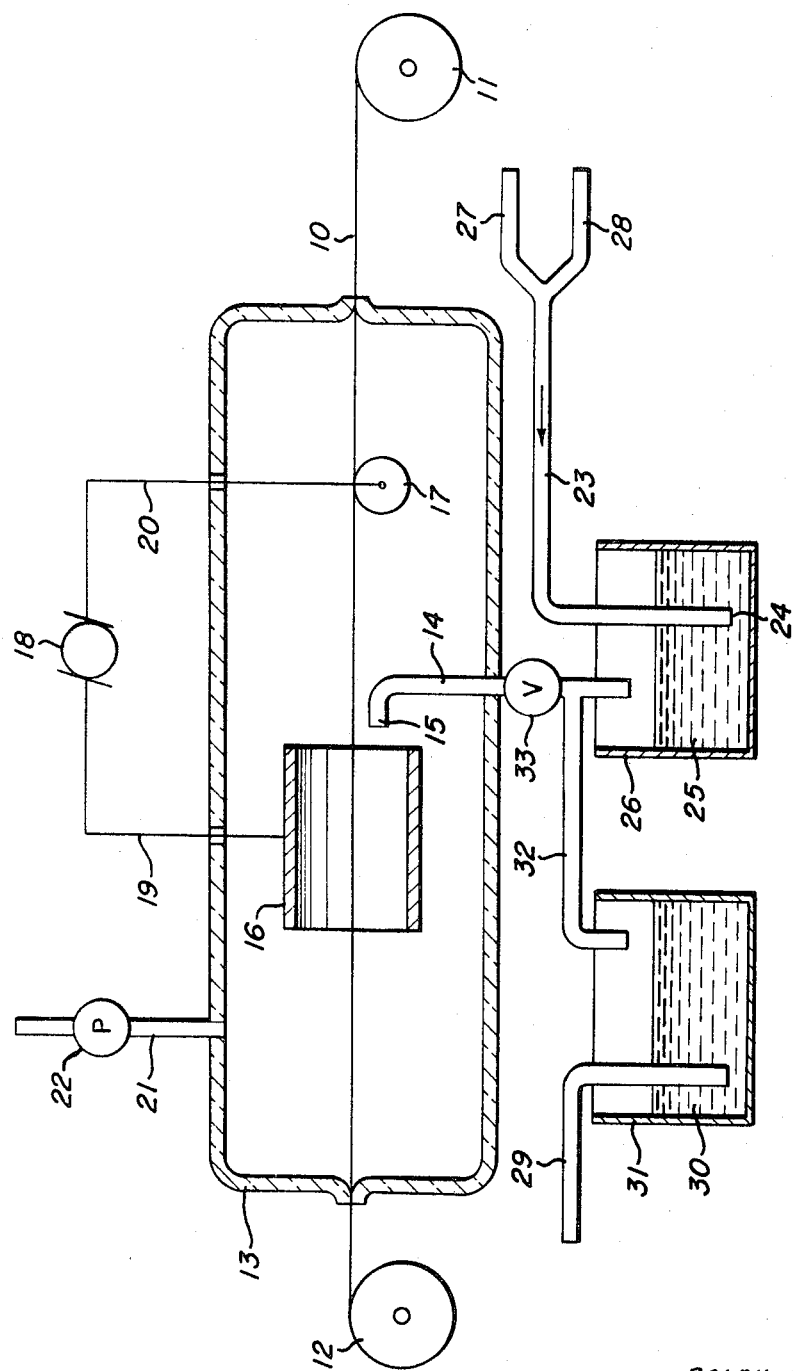
INVENTOR.
RALPH L. HOUGH
BY Harry A. Herbert Jr
ATTORNEY

United States Patent Office 3,437,511
Patented Apr. 8, 1969

3,437,511
METAL SURFACED WITH BORON AND COATING OF SILICON, SILICON CARBIDE OR TITANIUM NITRIDE
Ralph L. Hough, Springfield, Ohio, assignor to the United States of America as represented by the Secretary of the Air Force
Filed Apr. 7, 1966, Ser. No. 541,036
Int. Cl. B32b 9/00; B44d 1/42
U.S. Cl. 117—69                                         5 Claims

ABSTRACT OF THE DISCLOSURE

A boron surfaced metallic filament has improved oxidation resistance by having a coating thereon of one or more materials chosen from silicon, silicon carbide and titanium nitride.

---

The invention described herein may be manufactured and used by or for the United States Government for governmental purposes without payment to me of any royalty thereon.

The present invention relates to an improved reinforcing material, particularly one in fibrous or filamentous form, for incorporation in a variety of resinous or similar matrices to improve the structural properties thereof. Still more specifically, the present invention relates to such reinforcements, at least the surfaces of which are composed of boron or a similar refractory material, so that the composite of which they are a part will have improved strength and dimensional stability, especially at high temperatures and in atmospheres with a high oxidation potential.

The advancing technology in many fields, but particularly in regard to high speed aircraft, aerospace vehicles and rocket engines, is encountering ever-increasing temperatures and oxidative environments calling for new materials and compositions to withstand the same. In answer to these demands, attention has been directed to the reinforcement of conventional structural materials such as high temperature plastics or resinous compositions and certain inorganic refractory substances as matrices with fibrous or filamentous refractory materials such as carbon in its crystalline or non-crystalline form and, still more recently, such as boron. While the boron, even where it is only the surface coating of the reinforcing fibers or strands, has improved the modulus and strength of the composites of which such reinforcements are a part, it has not been heretofore possible to fully bond or adhere the reinforcing components to the matrix to the extent that a truly integrated structure could be obtained to take advantage of the full effect of the improvements which the reinforcing materials themselves might otherwise be expected to provide. Moreover, while the boron coated reinforcements have demonstrated excellent strength and modulus characteristics, they have not been particularly resistant to oxidative degradation; and improvement has been sought in this area. Beyond this, the boron has been found to be a relatively reactive substance, particularly at elevated temperatures, with the result that there has in many cases been a tendency for the boron to react with the matrix material with which it is intimately associated to cause a deterioration of either the reinforcement or the matrix to the detriment of the stability and strength of the reinforced composite.

It is accordingly an object of this invention to provide an improved reinforcing material to be combined with a variety of structural matrices to improve the high temperature structural properties of the composite.

Yet another object of the invention is to provide such a reinforcement which may be easily and firmly bonded to a variety of such matrix materials.

Still another object of the invention is to provide a reinforcing material which is capable of increasing the high temperature strength of the reinforced composite on the one hand and is capable itself of withstanding exposure to oxidatively degrading environments on the other.

Yet another object of the invention is to provide a reinforcement in the form of fibers or filaments, at least the surfaces of which are composed of boron or a related metal which will not react with the matrix materials with which it is combined as a reinforcement.

Yet another object of the invention is to provide a method for the manufacture of such reinforcing materials.

To achieve these and other objects and advantages which will appear from a reading of the following disclosure, the present invention provides a surface treatment of fibers or filaments composed at least on their surfaces of boron or of a related metal such as nickel, titanium or titanium diboride. More specifically, the invention teaches the application to such metal-surfaced fibers or filaments of a film or coating of one or more of that particular class of materials which consists of silicon, silicon carbide and titanium nitride. To accomplish such a coating, the present invention teaches the ionization-deposition thereof in an ionization or glow-discharge apparatus from a gas or vapor comprising a halide of the metallic component which may be admixed with an inert carrier gas and/or other gases containing the other elements to be combined with the metal in the formation of the ultimately desired coating. Thus, where the silicon coating is desired, a mixture of hydrogen, argon and silicon tetrachloride may be introduced into the ionization-deposition chamber. To accomplish the coating of silicon carbide, a mixture of hydrogen, silicon tetrachloride and acetone vapors may be employed; and, to achieve the titanium nitride coating, a mixture of hydrogen, titanium tetrachloride and nitrogen may be used. To accomplish the ionization-deposition of a solid film or coating from such a gaseous mixture, a non-uniform electrical field is established around the fibrous or filamentous substrate to be coated, and a voltage or electromotive force is established between the substrate and a zone within the deposition gas spaced from the substrate of a sufficient magnitude to cause the gaseous mixture to become ionized and concentrated at the substrate under sufficient electrical energization that a surface plating reaction will occur. In the preferred practice, the gaseous mixture is maintained at a substantial vacuum during the ionization and deposition.

The invention thus generally described may be more clearly understood by reference to the following detailed description of certain specific examples thereof in connection with which reference may be had to the appended drawing which is an elevational view, schematic in character, of an ionization or glow-discharge device for applying the coating.

As is preferred in many cases, the reinforcement is in the form of a continuous filament 10 of substantial length which may be stored upon the supply spool 11 and taken up, after it has passed through the deposition apparatus, upon the take-up reel or roller 12. In its simplest form, the glow-discharge plating apparatus as shown comprises a tube or cylindrical closure 13, preferably of a refractory material such as quartz, which is generally closed to confine a controlled deposition atmosphere therein except for vacuum seals at each end thereof to allow for the unrestricted passage of the substrate 10 therethrough. The deposition gas may be supplied by the conduit member 14, the upper opening 15 of which is in the vicinity of the electrode unit 16 which is in the form of an electrically conductive cylindrical shell substantially axially through which the substrate passes on its travel through the tube 13. Since the substrate itself, as will be hereinafter more fully described, is composed of an electrically conductive material, the necessary voltage to cause at least the ionization of the gaseous mixture issuing from the opening 15 may be conveniently established by connecting the electrode 16 and a substrate-contacting terminal such as the electrically conductive roller 17 with opposite poles of a direct current power source such as the direct current generator 18 via the conductor wires 19 and 20 respectively. In this case, the substrate itself is of course energized by its contact with the electrically energized roller 17. It is to be understood that a variety of electrode and terminal units may be employed to establish the necessary ionization potential between the substrate 10 and some point or zone within the gaseous mixture spaced therefrom. The desired vacuum within the tube may be maintained by associating the same via the conduit such as 21 with a vacuum pump 22; and to promote a uniform distribution of the deposition gas at least in the vicinity of the electrode 16 where the deposition is to occur, it is usually preferred that the vacuum forming means be associated with the tube 13 at some point thereon which is on the opposite side of the electrode 16 or the deposition zone from the point of introduction of the deposition gas.

As above stated, the substrate to be coated with the novel materials of the present invention and to achieve the reinforcing and structural effects sought by the art may be composed of a filament, fiber or strand of fibers of boron or a related metal or of a composite filament comprising a core of a high strength material such as tungsten having a surface coating of boron, nickel, titanium or titanium diboride. The reinforcements contemplated by this invention may be regarded as elongated units of individual fiber or staple length or of a much greater length constituting continuous strands or filaments. While the teachings hereof have been found to be particularly adaptable to the improvement of boron or boron-coated reinforcing fibers or strands in various matrices, the invention is also applicable to reinforcements composed of related metallic materials subject only to the limitation that they will not react with the subsequently applied films.

In a specific example of this invention wherein a silicon coating is to be applied to a boron-surfaced filament, the deposition gas should be composed of a carrier gas, for example, hydrogen and argon, which is introduced by the gas supply conduit 23, the forward opening 24 of which is submersed in a silicon halide such as silicon tetrachloride which at room temperature is the liquid 25 in the reservoir 26. As the carrier gas emerges from the opening 24, it will bubble through the silicon tetrachloride and vaporize the same so that a mixture of the carrier gas and the silicon tetrachloride in vapor form will be drawn or forced into the deposition zone via the conduit 14 and will issue from its opening 15 to form a cloud of such gas around the substrate 10 within the energizing electrode 16. In a specific example of this method, a flow of 200 milliliters per minute of hydrogen through the conduit branch 27 and of 40 milliliters per minute of argon through the conduit branch 28 may be bubbled through the silicon tetrachloride under a pressure differential resulting from the creation of a vacuum within the tube 13 of from 4 to 8 millimeters of mercury by operation of the vacuum pump 22 (the silicon tetrachloride in the reservoir 26 being at atmospheric pressure); and the substrate and electrode 16 may be energized by the generator 18 to have a potential difference of on the order of 1,000 volts which will cause the flow of a current of on the order of 8 milliamps between the electrode and the substrate. In the preferred practice, the association of the electrode and the substrate with the generator 18 by the respective conductors 19 and 20 is such that the substrate is the cathode and the electrode 16 is the anode. Under such conditions, it has been found that a uniformly dense and well integrated film of silicon will be deposited upon the boron surface of the substrate 10 at a sufficient synthesis rate that a coating one micron in thickness of the silicon will be deposited as the substrate moves at the rate of two feet per minute through the tube and the electrode 16 therein. It is to be understood however that the synthesis rate may be increased by increasing the voltage potential between the electrode and the substrate as a result of which a thicker coating may be deposited upon the substrate at a given speed of its movement through the electrode or the substrate may be moved more quickly through the electrode to obtain a film of the same thickness.

In the case of the deposition of a silicon carbide coating upon the same or a similar substrate, 40 milliliters per minute of hydrogen may be bubbled through a silicon tetrachloride bath such as the liquid 25 maintained in the reservoir 26 while 200 milliliters per minute of hydrogen from the second supply conduit 29 are simultaneously bubbled through a hydrocarbon such as acetone 30 in the reservoir 31 and introduced via the tube 32 connected to the conduit 14 which is also carrying the silicon tetrachloride vapor into the deposition tube at the electrode area. The streams of these two separately established vapors may be controlled by the valve 33 and the regulation of the pressures within the reservoir chambers 26 and 31 relative to the partial vacuum of on the order of 5.9 millimeters of mercury maintained within the tube 13. It has been found that the establishment of a voltage difference of 2300 volts between the electrode 16 and the substrate 10 will cause a 35 milliamp current to flow through the gaseous mixture in the electrode area which will ionize the gas and result in the deposition of a one micron thick coating of silicon carbide upon the substrate moving at the rate of two feet per minute. In lieu of the separate liquids for supplying the silicon and carbon to form the carbide, a carrier gas may be passed through a methyl or ethyl organo silane and then into the deposition zone.

Where a titanium nitride coating is to be thus deposited, 75 milliliters per minute of nitrogen via the branch tube 27 and 25 milliliters per minute of hydrogen via the branch tube 28 are passed through the reservoir or bubbling bath 26 containing titanium tetrachloride as the liquid 25; and the resultant vapor is introduced via the conduit 14 into the chamber within the tube which is maintained at a vacuum of on the order of 5.0 millimeters of mercury. In this case, the provision of an 800 volt potential between the electrode and the substrate results in the flow of from 40 to 60 milliamps between the two electrically energized components and in the deposition of a one micron thick film of the titanium nitride upon the substrate moving at the rate of two feet per minute.

As a demonstration of the improved bond obtained between the reinforcing filaments thus obtained and the matrices with which they are combined, resin adhesion shear tests carried out under the same conditions for different materials showed that only a 2.2 pound load was required to remove the filament from a resinous matrix where the filament was composed of boron without any coating as compared to a 7.7 pound load required where the boron surface was coated with silicon, to a 6.9 pound load where it was coated with silicon carbide and to a 7.2 pound load where it was coated with titanium nitride. By way of further comparison, the same reinforcing material, when coated with other related films did not provide the improved bond strengths made possible by the present invention. Thus, where a titanium coating was applied to the boron-surfaced filament, only 4.6 pounds were required to remove it from the matrix; only 3.3 pounds were so required in the case of a coating comprising an admixture of boron and carbon; and only 2.7 pounds were required in the case of a coating of nickel upon the boron filament. As a demonstration of the improved oxidation resistance provided by the coatings of the present invention, the boron-surfaced filaments coated with silicon carbide were subjected to aging tests in air at 700 degrees Fahrenheit for ten days, and the filament diameter remained practically unchanged; whereas the boron filament with no silicon carbide thereon experienced a 10 percent reduction in diameter upon the same exposure.

I claim:
1. An oxidation resistant filamentous reinforcement for resinous matrices comprising a boron-surfaced metal filament and a coating thereon made up of one or more of that class of materials which consists of silicon, silicon carbide and titanium nitride.
2. A reinforcement according to claim 1 wherein said coating is silicon.
3. A reinforcement according to claim 1 wherein said coating is silicon carbide.
4. A reinforcement according to claim 1 wherein said coating is titanium nitride.
5. A reinforcement according to claim 1 wherein said filament is tungsten.

References Cited

UNITED STATES PATENTS

| 3,011,912 | 12/1961 | Gareis et al. | |
| 3,170,859 | 2/1965 | Boudart et al. | |
| 3,306,764 | 2/1967 | Lewis et al. | 117—61 |
| 3,312,572 | 4/1967 | Norton et al. | |
| 3,317,356 | 5/1967 | Clendinning. | |

OTHER REFERENCES

Powell et al.: Vapor Plating, 1955, pages 9–11, 72, 73, 95–97, and 128 relied upon.

Missiles and Rockets, vol. 14, June 15, 1964, pp. 22 and 23 relied upon.

ALFRED L. LEAVITT, *Primary Examiner.*

A. GOLIAN, *Assistant Examiner.*

U.S. Cl. X.R.

117—93.1, 106, 128